United States Patent Office 3,575,697
Patented Apr. 20, 1971

3,575,697
ACID LEACHING OF MANGANESE FROM
SILICEOUS ORES AND SLAGS
Henry Dolezal, Salt Lake City, Utah, assignor to the
United States of America as represented by the Secretary of the Interior
No Drawing. Filed Jan. 7, 1969, Ser. No. 789,608
Int. Cl. C22b 47/00
U.S. Cl. 75—80                                    11 Claims

ABSTRACT OF THE DISCLOSURE

A process for recovering manganese from siliceous ores or slags comprising (1) mixing the ore or slag with an inorganic boron compound, (2) melting the mixture and holding it in the molten state until homogenous, (3) quenching the molten mixture, and (4) leaching manganese from the quenched mixture with an acid solution. The manganese obtained by the process of the invention finds utility in a wide variety of uses, e.g., in manufacture of alloy steels, as a purifying and scavenging agent in production of metals and as a source of manganese chemicals.

---

Melt and quench techniques for acid leaching of manganese from siliceous materials are known and are disclosed, e.g., in British Pat. 785,307. However, the prior art processes have required excessively long leaching periods and high reagent consumption, resulting in a costly operation.

It has now been found, in accordance with the present invention, that these disadvantages of the prior art processes may be largely overcome by incorporating an inorganic boron compound in the melt prior to quenching and leaching.

The process of the invention has been found to be particularly applicable to recovery of manganese from rhodonite. However, it may be used for recovery of manganese from any siliceous ore or from siliceous manganese-bearing slags, such as those obtained from ore furnaces used in the production of ferro-manganese. The boron compound may be any inorganic boron compound, preferably one containing a combination of boron and oxygen. Examples of suitable compounds are oxides of boron, e.g., $B_2O_3$; oxygen acids of boron, e.g., $H_3BO_3$ $HBO_2$ and $H_2B_4O_7$; salts of acids of boron, e.g., $Na_2B_4O_7$, $$Na_2B_4O_7 \cdot 10H_2O$$

and $Ca_2B_6O_{11} \cdot 5H_2O$, etc. Also, a mixture of one or more of these compounds may be used.

Optimum amounts of the boron compound (in terms of $B_2O_3$) will vary widely depending on the particular boron compound employed, the nature of the manganese ore or slag, the temperature of the melt, type of quench, etc. Generally, however, suitable amounts, in percent by weight, will range from about 1.0 to 7.0%, with the preferred range usually being from about 1.6 to 6.6%.

The manganese source material and the boron compound are mixed and the mixture is then melted and held in the molten state until homogenous. Alternatively, the boron compound may be added to a melt of the manganese material, or it can be part of a charge to a ferro-manganese furnace producing a boron-stabilized siliceous manganese slag for retreatment. The optimum temperature, at which the mixture is held in the molten state, will also vary considerably depending on the nature of the source material and the boron compound used. Usually, a temperature range of about 1300 to 1500° C. is satisfactory, with a range of about 1350 to 1450° C. generally being preferred. Initial grinding of hte source material and the boron compound, or a mixture of the two, may also be desirable in order to more readily achieve a homogeneous condition of the mixture in the molten state.

The melt is then rapidly quenched, a quench in cold water (temperature about 25 to 60° C.) usually being most practical; however, other means of rapid quenhcing such as a quench in oil, on a cold metal surface on in a jet of air may be useful for certain applications. The quenching is accomplished by conventional procedures, as by simply pouring, or otherwise introducing, the melt into cold water. The amount of quenching material is not critical but should preferably be an amount which will enable wet grinding to form a pulp.

The quenched material is then wet ground to a size that will enable ready dissolution of the manganese when the pulp is diluted with a suitable solvent solution. Generally, the finer the grind the faster the manganese can be leached. Grinding to a mesh size in the range of about 35 to 200 generally gives satisfactory results, both from the standpoint of leaching efficiency and ease of grinding. Optimum solids content in the pulp will vary according to the type of manganese source material, type of boron compound, leaching solution employed, extent of grinding, etc. Generally, however, a solids content of from about 10 to 30 percent gives satisfactory results.

The preferred solvent solution for leaching the manganese is prepared by adding sufficient sulfuric acid to the ground pulp to maintain it at a pH of from about 1.5 to 2.5, preferably at a pH of about 2. A suitable leaching solution may, therefore, advantageously comprise a weakly acidic (pH about 2.0) anolyte from an electrolytic cell. Although the process of the invention is particularly beneficial when such a sulfuric acid leach solution is employed, other weakly acidic solutions of acids such as hydrochloric or nitric, having pH values of from about 1.5 to 2.5 may also be advantageously used.

Time required for leaching may vary from about 20 to 60 minutes. However, a period of only about 25 to 45 minutes is usually sufficient, this being a major advantage of the process of the invention.

Certain impurities are usually dissolved along with the manganese in the leaching process. The major portion of these impurities, principally iron and a small amount of silica, may be precipitated by neutralizing the pulp to a pH of from about 3.5 to 6.0, preferably about 4.0. Pulverized limestone may be conveniently used for the neutralizing. Other suitable neutralizing agents are $Ca(OH)_2$, NaOH, $Na_2CO_3$, $NH_4OH$, MnO and additional quenched material. The solid residue in the neutralized pulp typically has a sandy texture, and it settles and filters rapidly.

The following examples will serve to more particularly illustrate the process of the invention.

EXAMPLES 1–4

Four melt and quench samples were prepared from a rhodonite-bearing ore which assayed, in percent by weight, 28.8 Mn, 1.8 Fe, 41.0 $SiO_2$, 1.2 $Al_2O_3$, and 3.2 CaO. The remainder of the ore consisted of non-interfering ingredients, specifically, lead, zinc, magnesium, barium and sulfur in small amounts (less than 1 percent) and $CO_2$ in the amount of 12.2 percent. In addition, the Mn and Fe were present in the form of oxides.

One of the melts was prepared without any additives; the other three were prepared with progressively larger quantities of boric oxide. The boric oxide was added in the form of sodium tetraborate ($Na_2B_4O_7$) by blending with the mineral before melting and quenching. Analyses of samples from these products are shown in Table 1.

TABLE I

| Melt No. | Analysis, percent by weight | | | | | | |
|---|---|---|---|---|---|---|---|
| | Mn | Fe | CaO | $Na_2O$ | $SiO_2$ | $Al_2O_3$ | $B_2O_3$ |
| 1 | 34.0 | 0.7 | 3.7 | 0.04 | 48.0 | 1.2 | 0.0 |
| 2 | 31.2 | 1.10 | 3.2 | .60 | 48.0 | 1.6 | 1.6 |
| 3 | 30.4 | .73 | 3.4 | 1.22 | 47.3 | 1.6 | 3.5 |
| 4 | 30.2 | .61 | 3.2 | 2.22 | 46.0 | 1.6 | 6.6 |

Each of the melt and quench products was tested by leaching a 185-gram portion, under agitation, in 1.8 liters of water which was acidified to a constant pH by the addition of a measured volume of 1 to 1 $H_2SO_4$. At the end of 1 hour the pulp was neutralized to a pH of 4.0 with a weighed quantity of pulverized limestone.

Leach No. 1 was made on a melt-quench product containing no additive. The melt and quench products for leaches Nos. 2, 3, and 4 contained boric oxide in amounts of 1.6, 3.5, and 6.6 percent, respectively. All four samples were leached at a pH of 2.0. The results of these leaches are shown in Table 2.

TABLE 2

| | Test No. | | | |
|---|---|---|---|---|
| | 1 | 2 | 3 | 4 |
| $B_2O_3$ in test sample, percent | 0.0 | 1.6 | 3.5 | 6.6 |
| Acidity of leach, pH | 2.0 | 2.0 | 2.0 | 2.0 |
| Leach time, minutes | 60.0 | 25.0 | 25.0 | 30.0 |
| Maganese extraction, percent by weight | 89.4 | 95.8 | 97.3 | 98.4 |
| Reagent consumption: | | | | |
| Lb. $H_2SO_4$ per lb. Mn leached | 2.34 | 2.24 | 2.20 | 2.30 |
| Lb. limestone per lb. Mn leached | 0.209 | 0.246 | 0.234 | 0.264 |

Comparison of the conditions and results obtained clearly shows the advantages of the addition of a boric oxide salt to the melt-quench operation. A 60-minute leach extracted only 89.4% of the manganese from a melted and quenched product made without the addition of boric oxide. Use of 1.6 to 6.6 percent $B_2O_3$ in the melt enabled extraction of 95.8 to 98.4 percent of the manganese in 25 to 30 minutes leach time. Consumption of acid and limestone was essentially the same for all tests.

What is claimed is:

1. A process for recovering manganese from a siliceous manganese source material comprising: (1) forming a molten mixture of the manganese source material and an inorganic boron compound, (2) holding the mixture in the molten state until homogenous, (3) quenching the molten mixture and (4) leaching manganese from the quenched mixture with an acidic soltuion.

2. The process of claim 1 in which the source material is a siliceous manganese ore.

3. The process of claim 2 in which the ore is a rhodonite-bearing ore.

4. The process of claim 1 in which the boron compound is an oxide, an oxygen acid or a salt of an oxygen acid.

5. The process of claim 4 in which the boron compound is sodium tetraborate or a hydrate thereof.

6. The process of claim 1 in which the mixture of manganese source material and boron compound are held in the molten state at a temperature of from about 1300 to 1500° C. for a period of from about 25 minutes to 45 minutes.

7. The process of claim 1 in which the molten mixture is quenched in cold water.

8. The process of claim 1 in which the acidic leaching solution is a solution of sulfuric acid.

9. The process of claim 8 in which the pH of the leach solution is from about 1.5 to 2.5.

10. The process of claim 1 including the additional step of precipitating impurities from the leached pulp by neutralizing to a pH of about 3.5 to 6.0.

11. The process of claim 10 in which the neutralizing agent is limestone.

References Cited

UNITED STATES PATENTS

| 2,221,622 | 11/1940 | Anderson | 75—80 |
| 2,221,623 | 11/1940 | Anderson | 75—80 |
| 2,221,624 | 11/1940 | Anderson | 75—80 |
| 2,535,536 | 12/1950 | Hagmaier | 75—93(A) |
| 2,737,441 | 3/1956 | Nossen | 75—121X |
| 2,959,477 | 11/1960 | Beam et al. | 75—121X |

FOREIGN PATENTS

| 785,307 | 10/1957 | Great Britain | 75—101 |

L. DEWAYNE RUTLEDGE, Primary Examiner

G. T. OZAKI, Assistant Examiner

U.S. Cl. X.R.

75—101, 121